July 1, 1947.  J. M. STRANG  2,423,267
OPTICAL SYSTEM FOR PERISCOPES
Filed July 14, 1944   2 Sheets-Sheet 1
FIG: 1.
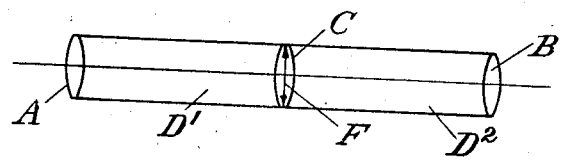
FIG: 2.
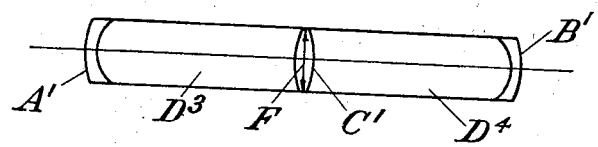
FIG: 3.
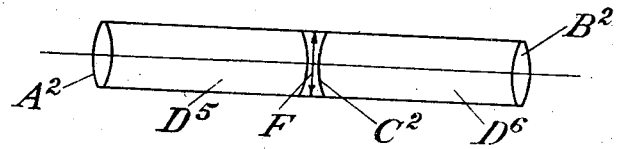
INVENTOR
John Martin Strang
by Retter, Mechlen
his attorneys

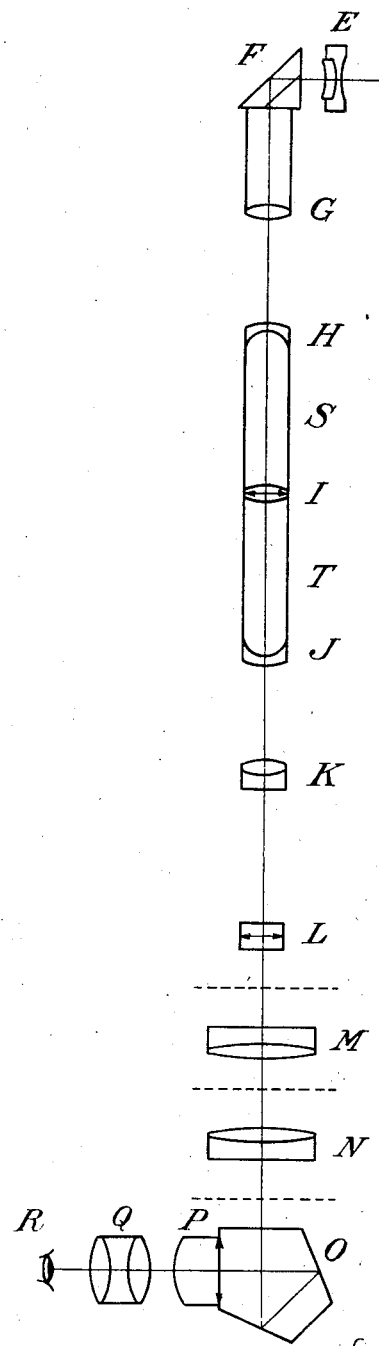

Patented July 1, 1947

2,423,267

UNITED STATES PATENT OFFICE 2,423,267

OPTICAL SYSTEM FOR PERISCOPES

John Martin Strang, Glasgow, Scotland, assignor to Barr & Stroud, Limited, Glasgow, Scotland Application July 14, 1944, Serial No. 544,844
In Great Britain June 30, 1941

2 Claims. (Cl. 88—57)

In optical systems, every time a beam of light passes from glass to air or from air to glass a certain percentage of the light is lost as far as transmission is concerned. The loss may be, for example 4% to 6%. It is therefore desirable in an optical system to reduce as far as possible the number of air/glass transmission surfaces.

In some optical instruments a comparatively large number of optical parts, spaced apart axially, are necessary into and out of which the light passes. This is particularly the case with submarine periscopes where great length with small diameter is desired, involving the inclusion of more than one complete telescope system arranged in series.

The chief object of the present invention is, in an optical system, especially for submarine periscopes, to obviate loss of light due to air/glass transmission, and to increase the distance between entrance and exit faces to a maximum due to refraction in the glass of the system.

The term "glass" in the present specification is to be understood as limited strictly to glass and not to include other solid transparent materials having optical properties such as synthetic plastics, the technique of working which is quite different from that of working glass with which latter material optical surfaces have to be formed by grinding and polishing. No material other than glass is to my knowledge capable of giving the results aimed at in the present invention, such as highest quality optical surfaces, freedom from distortion through time, hardness of surface, and homogeneity of the material in regard to its optical properties.

By "telescope system" is meant an optical system in which the light entering the system is parallel or substantially so and the light leaving the system is parallel or substantially so.

In the following description the term "eye lens" is used as denoting part of the telescope system. The term is used, however, not in the ordinary limited sense of a lens to which the observer's eye is applied but simply as denoting the lens of the telescope system nearest the eye. The eye may be applied to the lens in question, or other optical elements may be interposed between it and the eye, for example, a further complete telescope system as in the case of a submarine periscope.

The optical system in accordance with this invention may comprise three lenses (which may either be simple lenses or compound lenses) viz. an objective lens, a field lens, and an eye lens, with elongated intermediate bodies of glass, the intermediate bodies extending from the objective lens to the field lens and from the field lens to the eye lens and making optical contact with these lenses.

The invention will now be described with reference to the accompanying drawings, in which:

Figures 1, 2 and 3 show diagrammatically three examples of optical systems according to the invention, and Figure 4 shows the optical elements of a submarine periscope system according to the invention.

Referring to Figure 1, the telescope system shown comprises an objective lens A, an eye lens B, and a field lens C, all double-convex lenses. The lenses A and B are made of hard crown glass, refractive index 1.5185, and the lens C is composed of extra dense flint glass, refractive index 1.64. The space between the lenses A and C and the space between the lenses C and B are occupied by elongated glass bodies $D^1$, $D^2$, each of which has its ends worked to correspond in form with the curved lens surfaces to which its ends are cemented. These glass bodies $D^1$, $D^2$, are composed of dense flint glass, refractive index 1,6225. F denotes the focal plane at which the lens C is situated. A continuous path through glass is thus provided for the light from its entry into the objective A to its emergence from the eye lens B.

Figure 2 shows a modification of Figure 1 in which the objective $A^1$ and eye lens $B^1$ are concave-convex lenses while the lens $C^1$ is double convex. All three lenses $A^1$, $B^1$, $C^1$ are composed of dense flint glass and the intermediate glass bodies $D^3$, $D^4$ are composed of hard crown glass.

Figure 3 shows a further modification in which the lens $C^2$ is of double-concave form while the objective $A^2$ and the eye lens $B^2$ are of double-convex form, the lenses all being composed of hard crown glass, and the intermediate glass bodies $D^5$, $D^6$, being composed of dense flint glass.

Referring now to Figure 4, the periscope system shown comprises optical elements E . . . Q, the observer's eye position being at R. Of these elements, F and G are respectively, head and elbow reflecting prisms, E is the objective and L is a graticule. The lenses H, I, J, constitute one telescope system, and the lenses K, M, N, P, Q, constitute another telescope system, Q being the eyepiece. In accordance with the invention, the telescope H, I, J, is provided with intermediate glass bodies S, T, between the lenses H, I, J, the construction corresponding with what is shown in Figure 2.

Figure 2 illustrates a system where the corrections for spherical aberration, colour, curvature of field, astigmatism, and coma are particularly good. Details of an example of a system of this type are given below, where radii which have a positive sign are considered to be convex to the incident light, while those having a negative sign are concave to the incident light. The radii are denoted consecutively $r_1 \ldots r_6$ from left to right, and the thicknesses $t$, refractive indexes $n$, dispersive powers V, and the kind of glass, of the five components from left to right are given consecutively.

| Radii | Thickness | Refractive index $n_D$ | Dispersive power or V value |
|---|---|---|---|
| $r_1=1.030$ | | | |
| | $t_1=0.074$ | $n_1=1.6225$ | $V_1=36.0$ Dense flint |
| $r_2=0.575$ | | | |
| | $t_2=3.276$ | $n_2=1.5185$ | $V_2=60.3$ Hard crown |
| $r_3=0.691$ | | | |
| | $t_3=0.358$ | $n_3=1.6225$ | $V_3=36.0$ Dense flint |
| $r_4=-0.691$ | | | |
| | $t_4=3.276$ | $n_4=1.5185$ | $V_4=60.3$ Hard crown |
| $r_5=-0.575$ | | | |
| | $t_5=0.074$ | $n_5=1.6225$ | $V_5=36.0$ Dense flint |
| $r_6=-1.030$ | | | |

I claim:

1. An optical system for a submarine periscope comprising head reflecting prism means and an objective both adjacent the entrance face, elbow prism means and an eyepiece both adjacent the exit face, an elongated optical system of relatively small diameter including a first complete telescope system associated with the exit face of the periscope and comprising a plurality of optical elements spaced axially apart, and a second complete telescope system associated with the entrance face of the periscope and arranged in axial alignment with the first telescope system and operatively spaced apart therefrom, said second telescope comprising an object lens, a field lens, and an eye lens spaced axially apart in succession, an elongated glass body separating the eye and field lenses and abutting therebetween and another elongated glass body separating the field and object lenses and abutting therebetween, the ends of the said glass bodies being ground and polished to conform to the abutting surfaces of said lenses, and means for retaining said lenses and glass bodies securely together thereby forming a complete composite telescope system in which there is an uninterrupted passage for light from entrance to exit face of the system through glass; whereby loss of light due to air/glass transmission in said telescope is obviated and the distance between entrance and exit faces of the periscope optical system is increased due to refraction in said elongated glass bodies.

2. An optical system especially for submarine periscopes, comprising an object lens, a field lens and an eye lens, said lenses being spaced apart in elongated axial relationship, a first elongated glass body separating said object and field lenses in abutting relationship, and a second elongated glass body separating said field and eye lenses in abutting relationship, the ends of said glass bodies being formed to conform exactly to the shape of the abutting lenses, and the whole series of lenses and glass bodies being cemented together thereby forming a complete composite telescope system in which there is an uninterrupted passage for light from entrance to exit face through glass, whereby loss of light due to air/glass transmission is entirely obviated and the distance between entrance and exit faces is increased to a maximum due to refraction in the uninterrupted passage through glass.

J. MARTIN STRANG.

REFERENCES CITED

The following references are of record in the file of this patent:

UNITED STATES PATENTS

| Number | Name | Date |
|---|---|---|
| 2,328,603 | Bennett et al. | Sept. 7, 1943 |
| 2,346,002 | Bennett et al. | Apr. 4, 1944 |
| 488,506 | McIlwain | Dec. 20, 1892 |
| 874,049 | Borsch | Dec. 17, 1907 |
| 1,940,671 | Anderson | Dec. 26, 1933 |
| 1,339,386 | Ham | May 11, 1920 |
| 2,309,268 | Noske | Jan. 26, 1943 |
| 695,606 | Grun | Mar. 18, 1902 |